(12) United States Patent  
Yanagihara

(10) Patent No.: US 6,914,755 B2  
(45) Date of Patent: Jul. 5, 2005

(54) DISK UNIT, YOKE BUILT IN DISK UNIT AND PROCESS OF MANUFACTURING SAME

(75) Inventor: Shigeki Yanagihara, Tokorozawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 387 days.

(21) Appl. No.: 10/192,510

(22) Filed: Jul. 11, 2002

(65) Prior Publication Data

US 2003/0058582 A1 Mar. 27, 2003

(30) Foreign Application Priority Data

Sep. 21, 2001 (JP) ........................................ 2001-290243

(51) Int. Cl.[7] ................................................ G11B 5/55
(52) U.S. Cl. ................................ 360/264.8; 360/266.7
(58) Field of Search ........................... 360/264.8, 264.7, 360/264.9, 264.3, 266.7

(56) References Cited

U.S. PATENT DOCUMENTS

| | | | |
|---|---|---|---|
| 4,402,801 A | | 9/1983 | Omata et al. |
| 5,325,254 A | | 6/1994 | Cooperrider |
| 5,583,723 A | * | 12/1996 | Boeckner et al. ........ 360/256.2 |
| 5,822,157 A | * | 10/1998 | Uwabo et al. ........... 360/266.7 |
| 6,347,023 B1 | * | 2/2002 | Suwa ...................... 360/264.8 |
| 6,529,351 B1 | * | 3/2003 | Oveyssi et al. .......... 360/264.8 |

FOREIGN PATENT DOCUMENTS

| | | | | |
|---|---|---|---|---|
| FR | 2 531 212 | | 2/1984 | |
| JP | 04302874 A | * | 10/1992 | ........... G11B/21/02 |
| JP | 05225721 A | * | 9/1993 | ........... G11B/21/02 |
| JP | 05314514 A | * | 11/1993 | ............ G11B/7/09 |
| JP | 6-325507 | | 11/1994 | |
| JP | 11-102580 | | 4/1999 | |
| JP | 2000-166189 | | 6/2000 | |

* cited by examiner

Primary Examiner—William J. Klimowicz  
(74) Attorney, Agent, or Firm—Pillsbury Winthrop Shaw Pittman, LLP

(57) ABSTRACT

A disk unit has a voice coil motor to oscillate a suspension arm mounted at the leading end of a head with respect to a disk. The voice coil motor has a voice coil integrally attached to the tail end of the suspension arm, a magnet to cause a magnetic field to act on the voice coil, and a pair of yokes provided in such a positional relationship that the voice coil and magnet are sandwiched therebetween. At least one yoke has a roughly fan-shaped main body and a plate piece portion provided in a condition extended from one end side of the main body. After the formation of the main body and plate piece portion by press working, the yoke is formed by folding the plate piece portion on the main body.

11 Claims, 2 Drawing Sheets

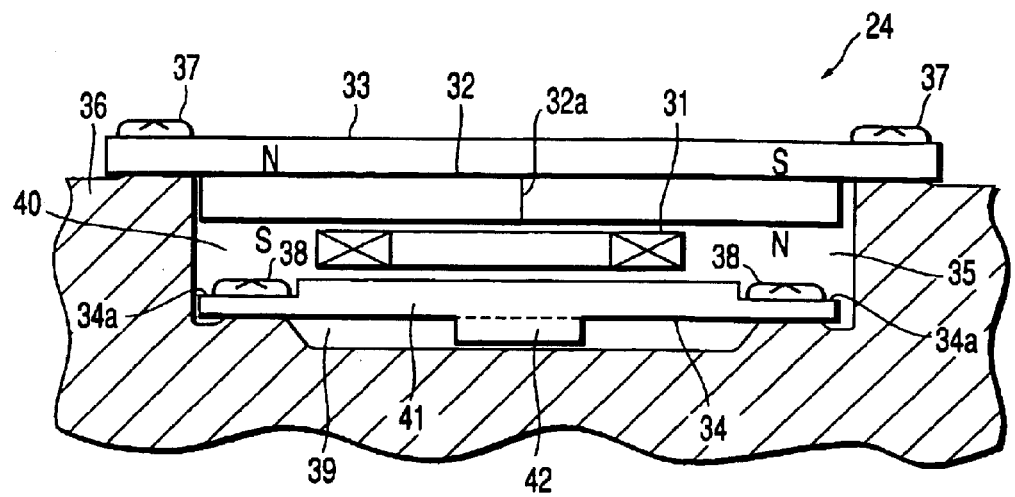
FIG. 2
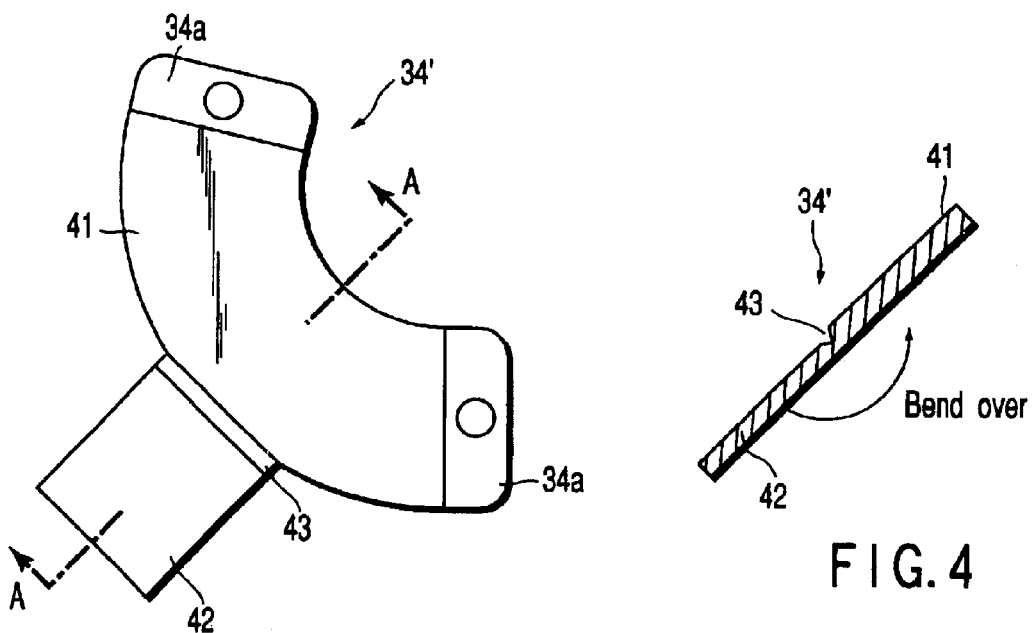
FIG. 3
FIG. 4

DISK UNIT, YOKE BUILT IN DISK UNIT AND PROCESS OF MANUFACTURING SAME

CROSS-REFERENCE TO RELATED APPLICATIONS

This application is based upon and claims the benefit of priority from the prior Japanese Patent Application No. 2001-290243, filed Sep. 21, 2001, the entire contents of which are incorporated herein by reference.

BACKGROUND OF THE INVENTION

1. Field of the Invention

The present invention relates to a disk unit which performs the writing and reading of data to and from a medium in the form of a disk, a yoke built into this disk unit and a process of manufacturing this yoke.

2. Description of the Related Art

A disk unit comprises a spindle motor which supports and rotates a medium in the form of a disk (hereinafter referred to simply as a disk), a head which performs the writing and reading of data to and from the disk, a suspension arm which is provided, at its leading end, with the head and which causes the head to be opposed to a desired track on the disk by oscillating the head, a bearing which oscillatably supports the suspension arm, and a voice coil motor to oscillate the suspension arm.

As a voice coil motor, one which is disclosed in Jpn. Pat. Appln. KOKAI Publication No. 6-325507, for example, is known. This voice coil motor has a coil which is integrally attached to a bearing which supports a suspension arm, a magnet to generate a magnetic field in the coil, a top yoke to which the magnet is bonded, and a bottom yoke opposed to the top yoke in such a positional relation that the coil is sandwiched between the bottom yoke and the magnet.

Thus, by causing a driving current to flow through the coil, an electromagnetic force is generated and the suspension arm is oscillated so that the head is opposed to a desired track on the disk.

However, the above-described conventional voice coil motor had the problem that a leakage flux through the yoke occurs. That is, when the yoke is made thin for miniaturization and weight reduction of the disk unit, magnetic saturation occurs in the yoke, generating an undesirable leakage flux. When a leakage flux is generated, undesirable magnetic fields are generated inside and outside the unit, thus posing the problem that irregularities such as noise occur.

Although it is, therefore, conceivable to increase the yoke thickness in the direction of the magnetic flux of magnet, the yoke becomes heavy, and this idea is inconsistent with weight reduction. Furthermore, attaching a plate piece or the like, as a separate body, to the yoke in order to increase the thickness, poses the problem that the manufacturing cost increases.

BRIEF SUMMARY OF THE INVENTION

The object of the invention is to provide a yoke which can be inexpensively and easily manufactured, effectively suppress leakage flux and exercise sufficient performance, a disk unit provided with this yoke, and a process of manufacturing this yoke.

The yoke related to an embodiment of the invention is at least one of a pair of yokes constituting a magnetic circuit with a magnet sandwiched between the pair of yokes, and comprises: a main body in the shape of a plate; and a plate piece portion integrally provided in a condition extended from an end side of this main body. In this yoke, the yoke thickness is increased in the direction of the magnetic flux of the above-described magnet by bending the above-described plate piece portion at the above-described end side and superposing the plate piece portion on the above-described main body.

According to this embodiment, the main body and plate piece portion can be simultaneously formed, for example, by press working and the yoke can be manufactured simply by folding the plate piece portion onto the main body. In addition, the thickness of a desired portion of the yoke can be easily and selectively increased and the generation of leakage flux to the outside can be effectively suppressed in a condition where a magnetic circuit is formed with the magnet sandwiched.

Furthermore, the disk unit related to an embodiment of the invention comprises: a recording medium in the form of a disk; a spindle motor which supports and rotationally drives this recording medium; a head which performs the reading of data from the recording medium; a suspension arm to the leading end of which this head is attached; a bearing which oscillatably supports this suspension arm; and a voice coil motor which is provided in the vicinity of the tail end of the above-described suspension arm and which causes the above-described head to be opposed to a desired track of the above-described recording medium by oscillating the above-described suspension arm with the above-described bearing serving as an axis of oscillation. The above-described voice coil motor comprises: a coil integrally attached to the vicinity of the tail end of the above-described suspension arm; a magnet to cause a magnetic field to act on this coil; and a pair of yokes which forms a magnetic circuit with the above-described magnet and coil sandwiched between the yokes. At least one of the above-described pair of yokes comprises: a main body in the shape of a plate; and a plate piece portion integrally provided in a condition extended from an end side of the above-described main body. In this disk unit, the yoke thickness is increased in the direction of the magnetic flux of the above-described magnet by bending the above-described plate piece portion at the above-described end side and superposing the plate piece portion on the above-described main body.

Furthermore, as the process of manufacturing the yoke related to an embodiment of the invention, there is provided a process of manufacturing at least one of a pair of yokes constituting a magnetic circuit with a magnet sandwiched between the yokes, which comprises the steps of: forming, by press working, a plate-like body which comprises a main body in the form of a plate having a uniform thickness in the direction of the magnetic flux of the above-described magnet and a plate piece portion integrally provided in a condition extended from an end side of this main body; and bending the above-described plate piece portion at the above-described end side and superposing the plate piece portion on the above-described main body.

According to this embodiment, the yoke can be manufactured simply by simultaneously forming the main body and the plate piece portion by press working and folding the plate piece portion onto the main body. Because the yoke thickness is increased by this method, the step of attaching the plate piece portion to the main body becomes unnecessary, with the result that the number of parts and manufacturing steps can be reduced and that the yoke manufacturing cost can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a schematic illustration of a voice coil motor built into the disk unit of FIG. 1.

FIG. 3 is a developed view of a bottom yoke of the voice coil motor of FIG. 2 before fold.

FIG. 4 is a sectional view of the bottom yoke of FIG. 3 taken along line A—A of that figure.

DETAILED DESCRIPTION OF THE INVENTION

Figure 1:
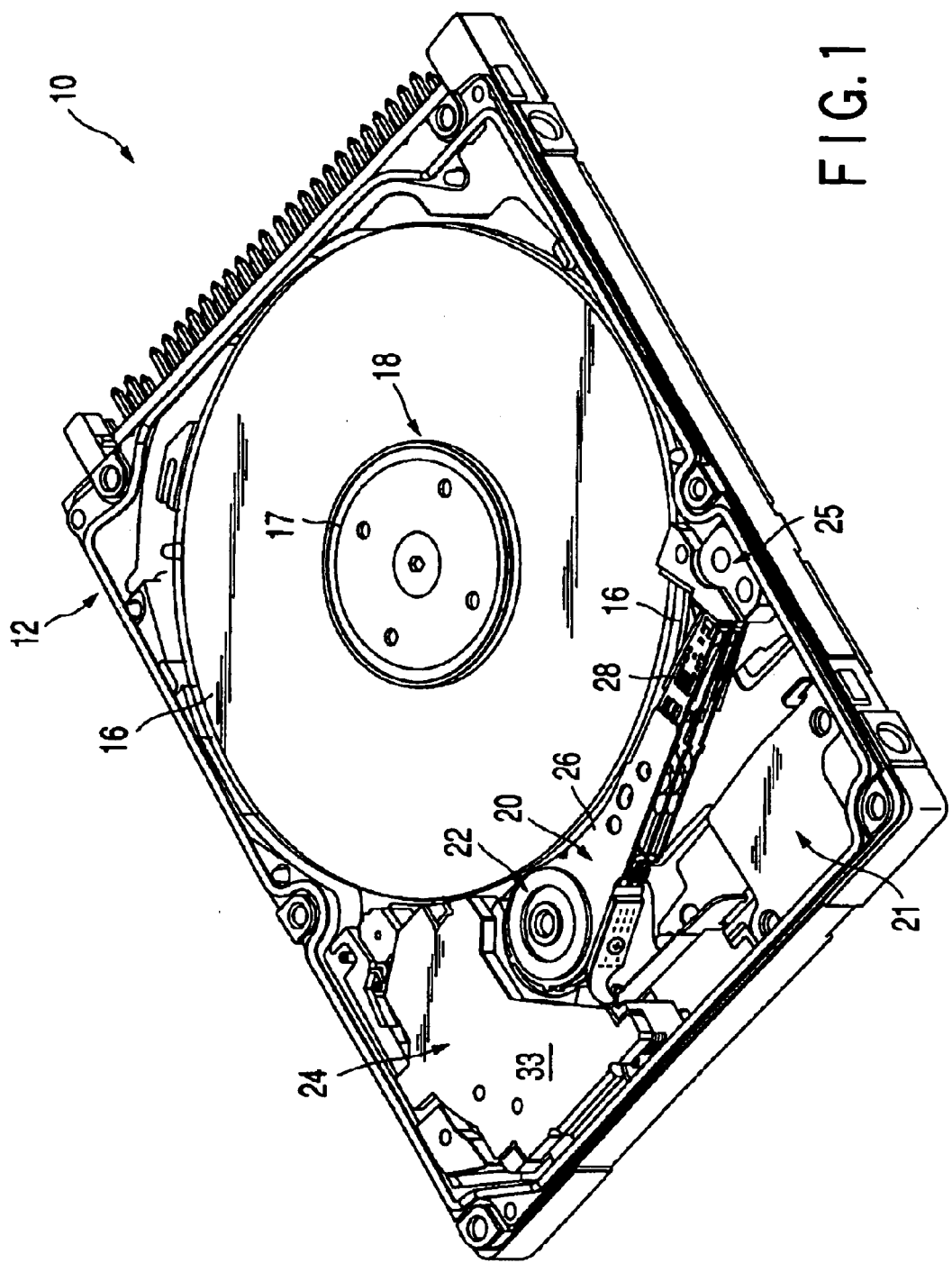
FIG. 1 is a perspective view of the rough structure of a disk unit related to an embodiment of the invention.

An embodiment of the invention will be described in detail below by referring to the drawings.

In FIG. 1 is shown the rough structure, in perspective, of a hard disk drive 10 (hereinafter referred to as an HDD 10) as a disk unit related to an embodiment of the invention.

The HDD 10 has a case 12 in the shape of a rectangular box having an open top face, and a top cover (not shown) which closes the top-end opening of the case 12 by being screwed to the case 12 by application of multiple twists. That is, FIG. 1 shows a condition in which the top cover is removed in order to illustrate the inner structure of the HDD 10.

Within the case 12 are housed, for example, two magnetic disks 16 as recording media, a spindle motor 18 which supports and rotationally drives these magnetic disks 16, four suspension arms 20, which are each provided, at their respective leading ends, with a magnetic head (not shown) which performs the reading and writing of information from and to the two surfaces of each of the magnetic disks 16, a bearing assembly 22 (bearing) to rotatably support each of these suspension arms 20 with respect to the magnetic disk 16, a voice coil motor (hereinafter referred to as a VCM) 24 to rotate and position each suspension arm 20, a ramped loading mechanism which holds the magnetic head of each suspension arm 20, which has moved to the outermost periphery of the magnetic disk 16, in a position spaced from the magnetic disk 16, and a substrate unit 21.

Each suspension arm 20 has an arm 26, the base end portion of which is attached to a bearing assembly 22, and a head suspension assembly 28, which is attached to the leading end of the arm 26 and which pendently supports the magnetic head (not shown) at the leading end thereof via a slider (not shown).

Also, on the outer surface of the bottom wall of the case 12, a printed circuit board (not shown) which controls the operation of the magnetic head (not shown), the spindle motor 18, and the VCM 24 is screwed, via the substrate unit 21.

Each magnetic disk 16 is formed with a diameter of 65 mm (2.5 inches) and has a magnetic recording layer on each of the top and bottom faces. The magnetic disk 16 is coaxially engaged by a hub (not shown) of the spindle motor 18 and held by a clamp spring 17. And the two magnetic disks 16 are rotationally driven at a prescribed speed by the spindle motor 18.

The four suspension arms 20 are oscillated by the VCM 24 with the bearing assembly 22 serving as an axis of oscillation, and each of the magnetic heads provided on the respective leading ends of the suspension arms 20 is moved onto a desired track on the magnetic disk 16. And the reading and writing of data from and to the magnetic disks 16 are performed via the magnetic heads.

In FIG. 2 is shown the rough structure of the above-described VCM 24.

The VCM 24 has a voice coil 31 attached to the above-described bearing assembly 22, a magnet 32 to cause a magnetic field to act on the voice coil 31, and a top yoke 33 and a bottom yoke 34 (hereinafter sometimes collectively referred to as a yoke), which are provided opposite to each other in such a positional relation that the voice coil 31 and magnet 32 are sandwiched between the two yokes and which form a magnetic circuit together with the magnet 32. The top yoke 33 is fixedly installed, by means of a screw 37, to a base 36 having a recess 35, and within the recess 35 are disposed the magnet 32, voice coil 31 and bottom yoke 34.

The magnet 32 is bonded to a bottom face side where the top yoke 33 is opposed to the recess 35. The bottom yoke 34 is fixedly installed to the bottom of the recess 35 by means of a screw 38 so as to be opposed to the top yoke 33 in a posture parallel to the top yoke 33. Incidentally, on the bottom of the recess 35 is further formed a recess 39 to house a plate piece portion 42 of the bottom yoke 34, which will be described later. A void 40 is formed between the bottom face of the magnet 32 and the top face of the bottom yoke 34, and the voice coil 31 is insertionally arranged in this void 40 in a non-contact condition via a prescribed gap.

The voice coil 31 is attached to a support frame (not shown) by molding. By integrally attaching this support frame to the bearing assembly 22 to which the tail ends of the suspension arms 20 are attached, the voice coil 31 is integrated into the four suspension arms 20. That is, the four suspension arms 20 and voice coil 31 are integrated via the bearing assembly 22 and can integrally oscillate with the bearing assembly 22 serving as an axis of oscillation.

The magnet 32 is formed almost in the shape of a fan having a curvature with the bearing assembly 22 regarded as the center, and magnetized in such a manner that the south and north poles change with a magnetization division line 32a, which divides the fan shape into two, serving as the boundary. The voice coil 31 is formed in a roughly trapezoidal shape having almost equal oblique lines, and arranged so that the two oblique lines of the trapezoid are opposed to the magnet 32 with the magnetization division line 32 interposed between the two oblique lines. That is, the direction of the magnetic field of the magnet 32 extends almost straight toward the bottom yoke 34, and the two oblique lines are inserted into spaces where the direction of the magnetic field is different.

Thus, when a driving current is caused to flow from a driving circuit (not shown) through the voice coil 31, the voice coil 31 is oscillated with the bearing assembly 22 serving as an axis of oscillation by an electromagnetic force, which is an interaction with a magnetic field formed by the magnet 32. That is, by changing the direction of the driving current, the four suspension arms 20 can be oscillated in a desired direction and the magnetic head attached to the leading end of each of the suspension arms 20 can be opposed to a desired track of the magnetic disk 16.

The thickness of each of the magnet 32, top yoke 33 and bottom yoke 34, which constitute the above-described magnetic circuit, is set at an almost uniform thickness, with the exception of the area of a counterbore 34a where a tapped hole used to screw the bottom yoke 34 to the bottom of the base 36 is formed. The counterbore 34a is inevitably formed so that the head of the screw 38 is not interposed in the void 40.

The thickness distribution of the magnet 32, top yoke 33 and bottom yoke 34 is designed so that the torque of the VCM 24 is maximized as far as possible with the weight of the VCM 24 minimized as far as possible. That is, reducing the weight of the VCM 24 can contribute to the weight reduction of the HDD 10 and the seek speed of the magnetic head can be raised by increasing the VCM torque.

In addition, in order to ensure that the weight of the VCM is reduced after a VCM torque of sufficient magnitude is secured, it is effective to reduce the thickness of the yokes 33, 34. However, if the thickness of the yokes 33, 34 is reduced too much, the yokes easily reach magnetic saturation and leakage fluxes occur from the yokes. When leakage flux occurs as in this case, irregularities such as noise are produced by the influence of the magnetic field.

Conversely, if the thickness of the yokes 33, 34 along the direction of a magnetic flux is increased in order to suppress leakage flux, the weight of the VCM 24 increases, providing inconsistency with the purpose of the weight reduction of the HDD 10.

In this embodiment, therefore, by partially increasing the thickness of the yokes 33, 34 along the direction of the magnetic flux, leakage flux is effectively suppressed with a weight increase held in check and the VCM torque is maximized as far as possible.

Because the top yoke 33 and bottom yoke 34 have an area sufficiently larger than that of the magnet 32, the magnetic flux density through the yokes is higher near the middle of the magnet 32, i.e., near the magnetization division line 32a than near the periphery of the magnet 32. For this reason, a leakage flux can be effectively suppressed by partially increasing the thickness of the yokes 33, 34 along the direction of magnetic flux near the magnetization division line 32a.

Because in increasing the thickness of the top yoke 33 and/or bottom yoke 34, it is physically impossible to increase the thickness in the direction of the void 40 where the voice coil 31 is interposed, it might be necessary to increase the thickness to the outside of the yokes 33, 34 away from the void 40. For example, when the thickness of the bottom yoke 34 near its middle is to be increased, it might be necessary to increase the thickness in such a manner that a convexity is formed on the outer side, i.e., the bottom face side of the yoke 34.

However, because on the top face side of the bottom yoke 34 a recess (i.e., counterbore 34a) used for screwing is necessary, it is impossible to form a convexity by press working on the opposite side (i.e., bottom face side). For this reason, although it is conceivable to attach the convexity as a body separate from the bottom yoke 34, in this method it is necessary to prepare the convexity as a separate body and the number of parts increases. Furthermore, work for attaching the convexity to the bottom face of the bottom yoke 34 becomes necessary and the number of manufacturing steps increases, posing the problem that the manufacturing cost increases.

In FIG. 3 is shown a condition where the bottom yoke 34 of this embodiment is spread. That is, the bottom yoke 34 of this embodiment is formed as a plate-like body 34', which has a roughly fan-shaped main body 41, in which the bearing assembly 22 serves as the center of the fan, and a plate piece portion 42 in the shape of a roughly rectangular plate integrally provided in a condition extended from one end side of the main body 41. As shown also in FIG. 4, a V-shaped groove 43 used to facilitate bending working is formed at the end side between the main body 41 and the plate piece portion 42. The V-shaped groove 43 is formed on the same side as the two counterbores 34a formed on the top face side of the main body 41. That is, the plate-like body 34' is formed in a shape capable of being formed by press working. Incidentally, the plate piece portion 42 is provided in such a position that in the position of the V-shaped groove 43, the plate piece portion 42 overlaps almost the middle of the main body 41 when folded 180° to the bottom face side of the main body 41.

The plate thickness of the plate piece portion 42 may be set at such a thickness that leakage flux leaking from the bottom yoke 34 to the bottom face side scarcely occurs when the plate piece portion 42 is built in the magnetic circuit as the bottom yoke 34, as shown in FIG. 2, or as shown in FIG. 4, the thickness of the plate piece portion 42 may be reduced to a thickness smaller than the plate thickness of the main body 41 for weight reduction. Incidentally, from the standpoint of ease of press working, it is preferred that the plate thickness of the main body 41 and the plate thickness of the plate piece portion 42 be the same. In this case, this plate thickness should be a thickness obtained by dividing the design value of thickness of the bottom yoke 34, which is capable of suppressing leakage flux, into two equal parts.

In manufacturing the bottom yoke 34, the plate-like body 34' shown in FIG. 3 is first fabricated by press working. The plate-like body 34' permits press working because this plate-like body is formed in such a manner that the bottom face side of the main body 41, which comes into face contact in a folded condition, obtains a flat surface and only the top face side is worked to provide concavity and convexity. And the plate piece portion 42 of the plate-like body 34' formed by press working is bent 180° in the position of the V-shaped groove 43 and superposed on the bottom face side of the main body 41. As a result, the plate piece portion 42 is folded almost in the middle of the main body 41 and the bottom yoke 34, in which the thickness of the middle portion is partially increased, is manufactured.

As described above, according to this embodiment, the bottom yoke 34, in which the thickness of the middle portion is partially increased, can be easily manufactured by simple work which involves forming the plate-like body 34' shown in FIG. 3 by press working and simply folding the plate piece portion 42 in the position of the V-shaped groove 43. Incidentally, this bottom yoke 34, when built in a magnetic circuit, can effectively suppress leakage flux without a substantial increase in the weight of the bottom yoke 34 and generate a sufficient VCM torque.

Incidentally, the invention is not limited to the above-described embodiment and can be varied variously within the scope of the invention. For example, although in the above-described embodiment the bottom yoke 34 was representatively described, it is also possible to apply the invention to the top yoke 33.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. At least one of a pair of yokes constituting a magnetic circuit with a magnet sandwiched therebetween, comprising:
   a main body in the shape of a plate; and
   a plate piece portion integrally provided in a condition extended from an end side of said main body,
   wherein the yoke thickness is increased in the direction of a magnetic flux of said magnet by bending said plate piece portion at said end side and superposing the plate piece portion on said main body.

2. A yoke according to claim 1, wherein said plate piece portion is provided in a portion where the magnetic field of said magnet is relatively strong.

3. A yoke according to claim 1, wherein said plate piece portion is folded on the side where said main body is spaced from said magnet.

4. A yoke according to claim 1, wherein the thickness of said plate piece portion is set at such a thickness that a leakage flux passing through said plate piece portion is not generated.

5. A yoke according to claim 1, wherein said main body and plate piece portion are formed with the same thickness and manufactured by press working.

6. A disk unit, comprising:
   a recording medium in the form of a disk;
   a spindle motor which supports and rotationally drives this recording medium;
   a head which performs the reading of data from said recording medium;
   a suspension arm to the leading end of which this head is attached;
   a bearing which oscillatably supports this suspension arm; and
   a voice coil motor which is provided in the vicinity of the tail end of said suspension arm and which causes said head to be opposed to a desired track of said recording medium by oscillating said suspension arm with said bearing serving as an axis of oscillation,
   said voice coil motor comprising:
   a coil integrally attached to the vicinity of the tail end of said suspension arm;
   a magnet to cause a magnetic field to act on this coil; and
   a pair of yokes which forms a magnetic circuit with said magnet and coil sandwiched therebetween,
   at least one of said pair of yokes, comprising:
   a main body in the shape of a plate; and
   a plate piece portion integrally provided in a condition extended from an end side of said main body,
   wherein the yoke thickness is increased in the direction of a magnetic flux of said magnet by bending said plate piece portion at said end side and superposing the plate piece portion on said main body.

7. A disk unit according to claim 6, wherein said plate piece portion is provided in a portion where the magnetic field of said magnet is relatively strong.

8. A disk unit according to claim 6, wherein said plate piece portion is folded on the side where said main body is spaced from said magnet.

9. A disk unit according to claim 6, wherein the thickness of said plate piece portion is set at such a thickness that a leakage flux passing through said plate piece portion is not generated.

10. A disk unit according to claim 6, wherein said main body and plate piece portion are formed with the same thickness and manufactured by press working.

11. A process of manufacturing at least one of a pair of yokes constituting a magnetic circuit with a magnet sandwiched therebetween, comprising the steps of:
    forming, by press working, a plate-like body which comprises a main body in the form of a plate having a uniform thickness in the direction of a magnetic flux of said magnet and a plate piece portion integrally provided in a condition extended from an end side of this main body; and
    bending said plate piece portion at said end side and superposing said plate piece portion on said main body.

* * * * *